(12) United States Patent
Puszkiel et al.

(10) Patent No.: US 11,879,594 B2
(45) Date of Patent: Jan. 23, 2024

(54) METHOD FOR MANUFACTURING HIGH-PRESSURE TANKS

(71) Applicants: Helmholtz-Zentrum Geesthacht Zentrum für Material-und Küstenforschung GmbH, Geesthacht (DE); assemblae, Gouda (NL); Stühff GmbH, Geesthacht (DE)

(72) Inventors: Julián Puszkiel, Barcelona (ES); José M. Bellosta Von Colbe, Wentorf (DE); Anton Nijkamp, Gouda (NL); Holger Stühff, Geesthacht (DE); Julian Jepsen, Hamburg (DE); Martin Dornheim, Reppenstedt (DE); Thomas Klassen, Wentorf (DE)

(73) Assignees: Helmholtz-Zentrum hereon GmbH, Geesthacht (DE); assemblae, Gouda (NL); Stühff GmbH, Geesthacht (DE)

( * ) Notice: Subject to any disclaimer, the term of this patent is extended or adjusted under 35 U.S.C. 154(b) by 98 days.

(21) Appl. No.: 17/248,271

(22) Filed: Jan. 15, 2021

(65) Prior Publication Data
US 2021/0222831 A1 Jul. 22, 2021

(30) Foreign Application Priority Data
Jan. 17, 2020 (EP) .................................... 20152411

(51) Int. Cl.
| | |
|---|---|
| *B29C 53/58* | (2006.01) |
| *F17C 1/14* | (2006.01) |
| *B29C 63/00* | (2006.01) |
| B29K 705/02 | (2006.01) |
| B29K 705/12 | (2006.01) |
| B29L 31/00 | (2006.01) |

(52) U.S. Cl.
CPC ............... *F17C 1/14* (2013.01); *B29C 53/58* (2013.01); *B29C 63/0065* (2013.01); *B29K 2705/02* (2013.01); *B29K 2705/12* (2013.01); *B29L 2031/7172* (2013.01); *F17C 2201/0109* (2013.01); *F17C 2203/0604* (2013.01); *F17C 2203/066* (2013.01); *F17C 2203/0639* (2013.01); *F17C 2203/0646* (2013.01); *F17C 2203/0663* (2013.01); *F17C 2209/2154* (2013.01); *F17C 2209/232* (2013.01); *F17C 2221/012* (2013.01); *F17C 2221/033* (2013.01)

(58) Field of Classification Search
CPC .......... F17C 2221/033; F17C 2221/012; F17C 2209/232; F17C 2209/2154; F17C 2203/0663; F17C 2203/066; F17C 2203/0646; F17C 2203/0639; F17C 2201/0109; F17C 1/14; B29L 2031/7172; B29K 2705/12; B29K 2705/02; B29C 63/0065; B29C 53/58
See application file for complete search history.

(56) References Cited

U.S. PATENT DOCUMENTS

| | | | | |
|---|---|---|---|---|
| 4,339,506 A | * | 7/1982 | Martin, Jr. .............. | B32B 25/04 428/521 |
| 5,828,003 A | | 10/1998 | Thomeer et al. | |
| 6,401,963 B1 | * | 6/2002 | Seal .......................... | F17C 1/06 220/586 |
| 7,036,677 B1 | * | 5/2006 | Funck ....................... | F17C 1/16 220/581 |
| 2013/0299505 A1 | | 11/2013 | Otsubo et al. | |

FOREIGN PATENT DOCUMENTS

EP 3 670 156 A1 6/2020

OTHER PUBLICATIONS

European Search Report for Application No. 20152411.3, dated Jul. 22, 2020.

* cited by examiner

Primary Examiner — Vishal I Patel
(74) Attorney, Agent, or Firm — MARSHALL, GERSTEIN & BORUN LLP

(57) ABSTRACT

A method for manufacturing tanks for storing or containing a fluid under pressure and a method for manufacturing pipes for containing or channeling a fluid under pressure, such as for storing, containing or channeling hydrogen, natural gas or a hydraulic fluid. The method is less complex than known procedures, can be employed in a continuous or semi-continuous manner and allows for a lower thickness of the shell made from the fibres. The method comprising providing a liner having a cylindrical portion with two ends and two dome portions at the respective ends of the cylindrical portions or a liner having a cylindrical portion and one or two open ends; fabricating a tube of fibre filaments by means of the pullwinding method; and wrapping the tube of fibre filaments onto the liner such that at least the cylindrical portion of the liner is enclosed by the tube of fibre filaments.

11 Claims, No Drawings

METHOD FOR MANUFACTURING HIGH-PRESSURE TANKS

CROSS-REFERENCE TO RELATED APPLICATION

Field of the Invention

The present application claims priority to European Patent Application No. 20152411.3, filed Jan. 17, 2020, which is hereby incorporated herein by reference.

The present invention relates to a method for manufacturing high-pressure tanks for storing or containing a fluid—liquid or gas, such as hydrogen or natural gas —under pressure.

BACKGROUND OF THE INVENTION

High-Pressure tanks have gained interest, especially for hydrogen or natural gas storage in vehicles or refuelling stations. While simple Type I metal tanks such as those made of steel and aluminum are able to safely store gases up to a maximum pressure ranging from 17.5 MPa (aluminum) to 30 MPa (steel), fibre filament-reinforced (Type II) or filament composite (Type III or IV) tanks are able to safely store gases up to a maximum pressure of 85 MPa.

Type II tanks are built by fibre filament winding carbon, aramid or glass fibres around a metal core. Type III tanks are made from a composite material which includes carbon, aramid or glass fibres around a metal liner. The metal component (in the case of Type III tanks) is provided for avoiding the diffusion of the gas through the composite material. Type IV tanks are composite tanks, e.g. of carbon, aramid or glass fibres with a polymer liner.

For producing those Type II, Type III and Type IV tanks, fibre filaments are positioned carefully one by one around the metal or polymer liner and held together using a matrix which matrix is usually made of an epoxy resin (although other materials may be possible). Such method is, for example, described in US 2013/0299505 A1, published Nov. 14, 2013. The thickness of the shell made from the fibres usually ranges between 3 mm and 30 mm.

This method of weaving of individual strands of fibres makes the construction complex, time-consuming and therefore costly.

It is therefore an object of the invention to provide a method for manufacturing high-pressure tanks or other pressure-resistant fluid reservoirs, such as hydrogen or natural gas storage tanks, which is less complex than the known procedures, which can be employed in a continuous or semi-continuous manner, and which may allow for a lower thickness of the shell made from the fibres, taking into account pressure safety.

SUMMARY OF THE INVENTION

In an embodiment the present invention relates to a method for manufacturing tanks for storing or containing a fluid under pressure, comprising the steps of
    (a) providing a liner having a cylindrical portion with two ends and two dome portions at the respective ends of the cylindrical portion;
    (b) fabricating a tube of fibre filament reinforced material by means of the pullwinding method; and
    (c) wrapping the tube of fibre filament reinforced material onto the liner such that at least the cylindrical portion of the liner is enclosed by the tube of fibre filament reinforced material.

In another embodiment the present invention relates to a method for manufacturing pipes for containing or channeling a fluid under pressure, comprising the steps of
    (a) providing a liner having a cylindrical portion with one or two open ends;
    (b) fabricating a tube of fibre filament reinforced material by means of the pullwinding method; and
    (c) wrapping the tube of fibre filament reinforced material onto the liner such that the cylindrical portion of the liner is enclosed by the tube of fibre filament reinforced material.

Pullwinding is a method usually applied for producing high performance composite tubes and combines the techniques of conventional pulltrusion and continuous filament winding. In the method of pullwinding longitudinal fibres are co-extruded via a pulltrusion process with hoop wound continuous fibres.

In an embodiment of step (b), longitudinal fibres are positioned as an outer filament layer or as an inner filament layer of the tube of fibre filaments. The outer filament layer may be positioned at an outside surface and/or at an inside surface of the tube of fibre filaments, whereas the inner filament layer is defined as not being exposed to a surface of the tube of fibre filaments. In addition to the longitudinal fibres, one or more hoop wound layers of fibres are wound around or inside the longitudinal fibres. The hoop wound layers of fibres may be wound at an inclined angle around the longitudinal fibres, usually at an angle of from 20° to about 79°, preferably from about 30° to about 60°, more preferably about 45°. The fibres wound about at an inclined angle around the longitudinal fibres may function to compensate torsion and bending forces. Alternatively or additionally, the hoop wound layers of fibres may be wound around or inside the longitudinal fibres at a transverse angle of about 80° to about 89.9° (or about 0.1° to about 10°) around the longitudinal fibres; the angle is not truly 90° because of the slightly helical nature of the winding and the lateral movement of a wound roving, one band width of advance with each circumferential path. The fibres wound at a transverse angle around the longitudinal fibres may function to absorb radial forces arising from the internal pressure in the metal liner. Any combination of longitudinal and hoop wound fiber layers is possible, in order to best absorb the forces that the tube will be subjected to.

If more than one hoop wound layers is positioned internally in the tube wall or at the external surface of the inside or outside tube wall of the tube of fibre filament reinforced material, the winding of the hoop wound layers, whether inclined or transverse, is preferably alternating in clockwise and in counter-clockwise directions.

In another embodiment, the tube of fibre filament reinforced material may be wound around the inside surface and/or the outside surface of a core of a different material such as a core of a foam material, a core of an elastic polymer, a rubber core or a core of a composite material. In yet another embodiment, two tubes of fibre filament reinforced material are wound around a core of a different material such as a core of a foam material, a core of an elastic polymer or a rubber core, one tube of fibre filament reinforced material around the inner surface of the core material, and another tube of fibre filament reinforced material around the outer surface of the core material.

In the method of manufacturing tanks for storing or containing a fluid under pressure and/or manufacturing pipes for containing or channeling a fluid under pressure, the tube of fibre filament reinforced material may be affixed to the liner by means of heat shrinking the fibre filament reinforced material onto the liner. This—of course—presupposes that the fibre filament reinforced material is heat-shrinkable. In another embodiment of the present invention, the tube of fibre filament reinforced material may be may be affixed to the liner by means of gluing the fibre filament reinforced material onto the liner.

Thus, in another embodiment the present invention relates to a method for manufacturing tanks for storing or containing a fluid under pressure comprising the steps of:
(a) providing a liner having a cylindrical portion with two ends and two dome portions at the respective ends of the cylindrical portions;
(b) fabricating a tube of fibre filaments by means of the pullwinding method;
(c) wrapping the tube of fibre filaments onto the liner such that at least the cylindrical portion of the liner is enclosed by the tube of fibre filaments; and
(d) applying heat to shrink the tube of fibre filaments onto the liner and/or gluing the tube of fibre filaments onto the liner.

In yet another embodiment the present invention relates to a method for manufacturing pipes for containing or channeling a fluid under pressure comprising the steps of:
(a) providing a liner having a cylindrical portion with one or two open ends;
(b) fabricating a tube of fibre filaments by means of the pullwinding method;
(c) wrapping the tube of fibre filament reinforced material onto the liner such that the cylindrical portion of the liner is enclosed by the tube of fibre filament reinforced material; and
(d) applying heat to shrink the tube of fibre filaments onto the liner and/or gluing the tube of fibre filaments onto the liner.

When fitting the fibre filaments onto the liner, care should be taken that the inner body can still expand in the case of a temperature rise inside the tank.

In a preferred embodiment of any of the previous embodiments, the liner is made of metal, preferably of aluminium or steel. With regard to tanks for storing or containing a fluid under pressure, the metal liner may be composed of a cylindrical part welded to dome portions on each side of the cylinder.

Alternatively, the liner may be made of a plastic material which provides a diffusion barrier for the fluid. With regard to tanks for storing or containing a fluid under pressure, the plastic liner may be composed of a cylindrical part glued to a dome portion on each side of the cylinder.

In both of the above embodiments, whether the liner is of metal or of plastic material, the dome portions may be held by a central rod which extends along a central axis of the cylinder, and where the central rod—if hollow—may be used as a fluid conduit. In yet another embodiment, the dome portions may be held by an array of rods disposed around the cylinder, where the wall of the cylinder may be a double wall or a single wall, and the array of rods is placed between the walls, outside or inside of the fibre-composite tube. In the embodiments using arrays of rods to hold the domes at the ends of the cylinder, the rods may be hollow and may serve to cool and/or to heat the liner and its contents, or as a fluid conduit.

In another preferred embodiment of any of the previous embodiments, the enclosing fibre filaments are made of carbon, aramid, glass fibres, or any combination thereof.

It has been found that the method according to the invention is extremely well suited for continuous or semi-continuous production of tanks for storing or containing a fluid under pressure, especially Type II high-pressure tanks, or for pipes for containing or channeling a fluid under pressure, as it is possible to achieve a high throughput at comparatively low cost. Moreover, the thickness of the polymeric shell, that withstands the pressure, is notably reduced down to, in the best case and depending on the desired pressure resistance, 5 mm or even 3 mm. This is due to the possibility of laying the fibres at an approximate 90° angle from the longitudinal axis of the core, therefore being able to fully absorb the radial stress generated by the fluid's pressure. At the same time, the amount of fibres in other directions may be reduced in comparison with other fibre-laying techniques, yielding the desired reduction in overall wall thickness.

The inner liner—if made of metal—can be produced by providing a metal tube of a desired diameter and wall thickness and welding two end caps thereon. A metal liner can also be produced by deep drawing a metal tube of a desired diameter and wall thickness containing a drawing end cap, two drawing end caps—one at each end—or welding one end cap thereon, by additive manufacturing or by die casting the metal in the appropriate shape. If made of a polymer, the liner may be manufactured by extrusion or gluing.

In a still further embodiment of the invention an intermediate layer of an elastic material, such as of a foam material, an elastomeric polymer or of a rubber, is provided between the liner and the fibre filament reinforced material, for example to compensate dilatation differences between metal core (which expands when heated) and composite shell (which usually quite does not expand much when heated).

The invention claimed is:

1. A method for manufacturing tanks for storing or containing a fluid under pressure, comprising the steps of:
   (a) providing a liner having a cylindrical portion with two ends and two dome portions at respective ends of the cylindrical portions;
   (b) independently fabricating a tube of fibre filament reinforced material by pullwinding; and
   (c) fitting the tube of fibre filament reinforced material onto the liner such that at least the cylindrical portion of the liner is enclosed by the tube of fibre filament reinforced material;
   wherein the enclosing fibre filaments are made of carbon, aramid, glass fibres, or any combination thereof.

2. A method for manufacturing tanks for storing or containing a fluid under pressure, comprising the steps of:
   (a) providing a liner having a cylindrical portion with two ends and two dome portions at respective ends of the cylindrical portions;
   (b) independently fabricating a tube of fibre filament reinforced material by pullwinding; and
   (c) fitting the tube of fibre filament reinforced material onto the liner such that at least the cylindrical portion of the liner is enclosed by the tube of fibre filament reinforced material; and
   (d) applying heat to shrink the tube of fibre filament reinforced material onto the liner and/or gluing the tube of fibre filament reinforced material onto the liner;
   wherein the enclosing fibre filaments are made of carbon, aramid, glass fibres, or any combination thereof.

3. The method of claim 1, wherein in step (b), longitudinal fibres are positioned as an outer filament layer or as an inner filament layer or as an intermediate filament layer of the tube of fibre filament reinforced material.

4. The method of claim 3, wherein one or more hoop wound layers of fibres are wound around or inside the longitudinal fibres.

5. The method of claim 4, wherein hoop wound layers of fibres are wound at an inclined angle of from 20° to about 79° around the longitudinal fibres.

6. The method of claim 4, wherein hoop wound layers of fibres are wound at a transverse angle of about 80° to about 89.9° or about 0.1° to about 10° around the longitudinal fibres.

7. The method of claim 1, wherein the liner is made of aluminium or steel.

8. The method claim 1, wherein an intermediate layer is provided between the liner and the fibre filaments.

9. The method of claim 8 wherein the intermediate layer is made of foam material, an elastomeric polymer or of a rubber.

10. The method of claim 1, wherein the dome portions are held by a central rod which extends along a central axis of the cylinder.

11. The method of claim 1, wherein the dome portions are held by an array of rods disposed around the cylinder.

* * * * *